United States Patent
Seiler et al.

[15] 3,703,018
[45] Nov. 21, 1972

[54] REPLACEMENT WINDSHIELD WIPER UNIT

[72] Inventors: Lazar I. Seiler; James P. Nicholas, both of Norwalk, Conn.

[73] Assignee: Yankee Metal Products Corporation, Norwalk, Conn.

[22] Filed: Aug. 4, 1971

[21] Appl. No.: 168,959

[52] U.S. Cl. ............................................. 15/250.42
[51] Int. Cl. .............................................. B60s 1/02
[58] Field of Search......... 15/250.36, 250.31, 250.32, 15/250.42

[56] References Cited

UNITED STATES PATENTS

| | | | |
|---|---|---|---|
| 2,907,065 | 10/1959 | Macpherson | 15/250.42 |
| 2,983,945 | 5/1961 | De Pew | 15/250.42 |
| 3,083,394 | 4/1963 | Scinta | 15/250.42 X |
| 3,233,273 | 2/1966 | Anderson | 15/250.42 |
| 3,421,175 | 1/1969 | Roberts | 15/250.42 |
| 3,626,544 | 12/1971 | Lopez et al. | 15/250.42 |

Primary Examiner—Peter Feldman
Attorney—Merrill F. Steward et al.

[57] ABSTRACT

A windshield wiper replacement unit is disclosed, incorporating means for interlocking the unit with a conventional wiper arm pressure-distributing bow or bridge. The replacement unit consists of a resilient elastomeric wiper blade, and a pair of flat, narrow, metal rails which are received edgewise in and extend along grooves let into opposite side faces of the elastomeric wiper blade, straddling the wiping edge of the blade to provide lateral rigidity while allowing longitudinal flexibility of the assembly so that the wiping edge of the blade can conform to contour changes in the surface of the windshield. The rails are fastened together at their ends to sandwich the elastomeric wiper blade between them and are adapted to be slidingly received between paired claws at opposite ends of the pressure-distributing wiper arm bow. One of the rails is provided with a pivotable latch lever positionable to trap a claw of the bow structure and thereby restrict sliding movement of the replacement wiper unit relative to the bow.

9 Claims, 4 Drawing Figures

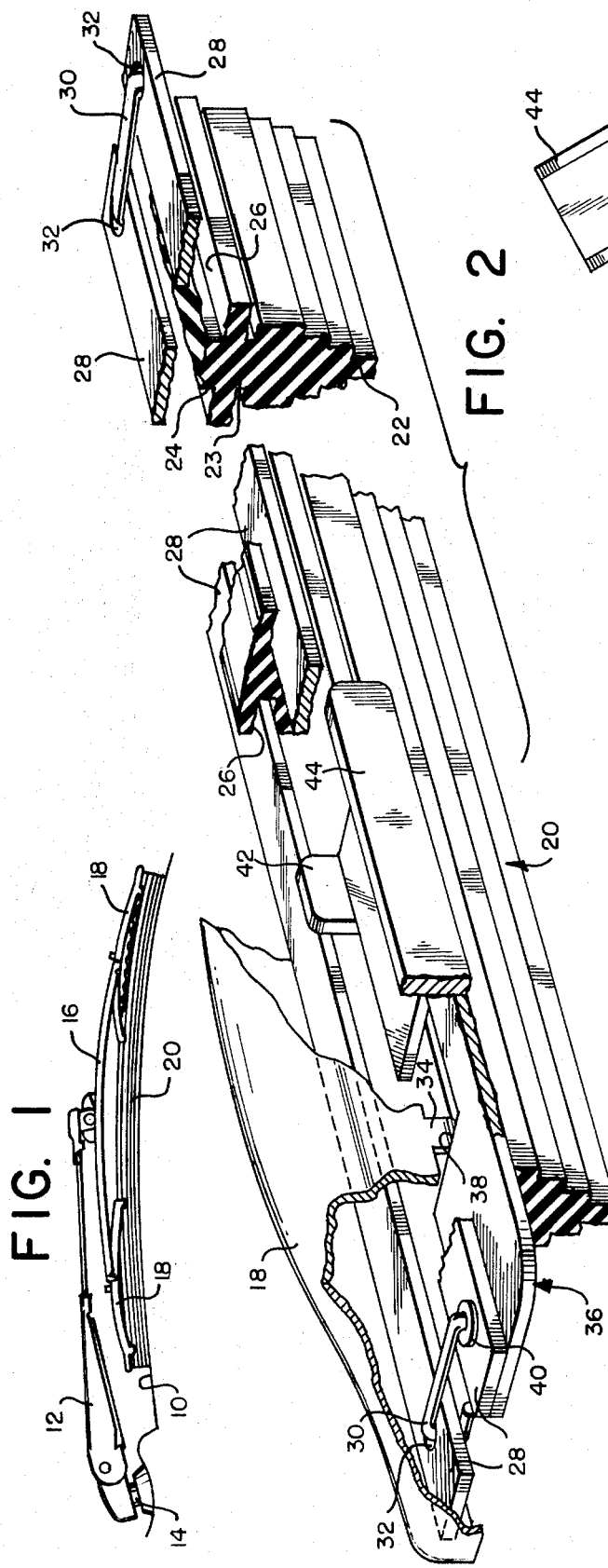
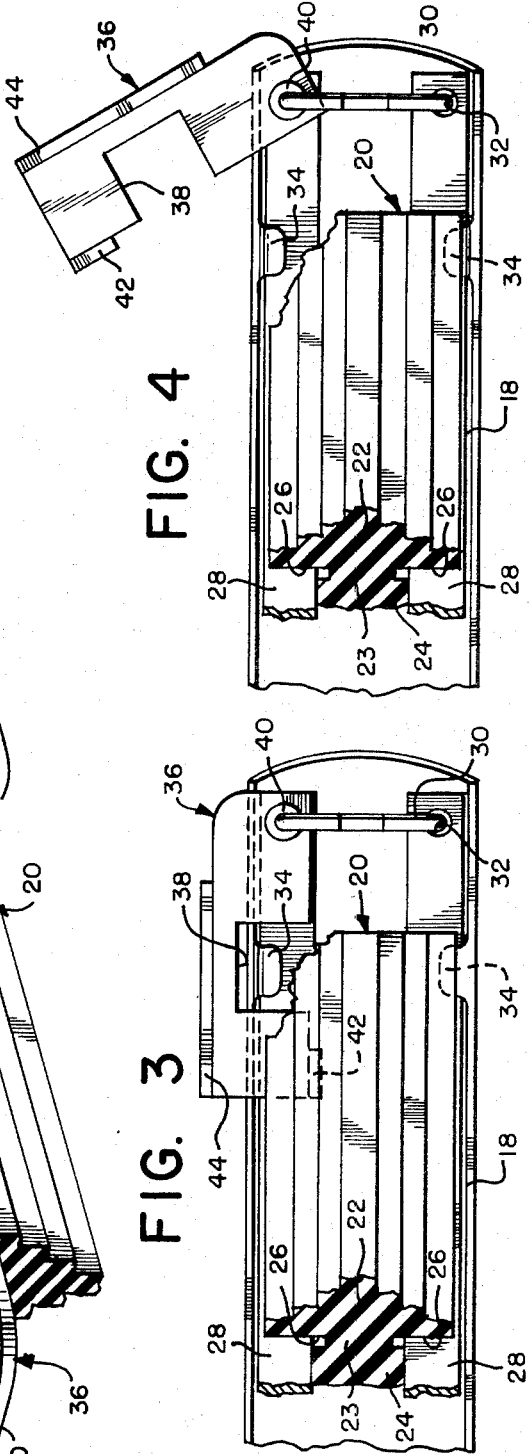

REPLACEMENT WINDSHIELD WIPER UNIT

This invention pertains to automotive windshield wiper assemblies, and particularly to interlock means for interconnecting a wiper blade or squeegee replacement unit and the pressure applying superstructure of a windshield wiper arm.

The squeegee portion of automotive windshield wiper blade assemblies require relatively frequent replacement owing to the fact that the rubber or other elastomeric blade material deteriorates with exposure to the atmosphere and abrasion caused by friction against a gritty surface of a windshield. With almost universal use now of multiply curved windshields in automobiles, the wiper construction must make provision for flexing of the squeegee member, and the proper distribution of pressure along such member, to ensure its conforming to variations in surface conture of the windshield as the squeegee is oscillated back and forth across the windshield.

Considerable ingenuity has been devoted to the design of wiper assemblies to produce a device which will be really effective in wiping the windshield surface clean of water, salt, fog, mud and similar accumulations, without leaving streaks which impair visibility through the glass. The design of such wiper assemblies has come to be generally standardized as a result of this work, in that usually there is some form of a yoke or bow member pivotally connected at its center to the end of the oscillating wiper arm. The ends of this yoke may then engage the mid points of a pair of secondary yokes or bows to dispose these in tiered alignment with the primary yoke, with each secondary yoke in turn engaging a squeegee unit at spaced points along its length, the purpose being to effect the aforesaid uniform distribution of pressure of the squeegee against the windshield's surface. Additional support of the squeegee is provided by stiffening or backing members to give lateral rigidity to the resilient wiper blade unit, yet allowing it to flex perpendicularly of the windshield.

The arrangement just described is somewhat complex, but necessary for supporting the squeegee member in a manner to permit it to function properly, yet allow it to be simply and readily removed when replacement is necessary. Means for latching the replacable squeegee unit to the superstructure must be simple and economical to manufacture, and easy to operate; yet the arrangement cannot sacrifice economy for assured functionality of the wiper since the device is so important to safe operation of an automobile. The various desiderata of the device are thus diverse and apparently conflicting.

The present invention affords an answer to some of the problems. A replacement wiper unit is provided which comprises, in combination, a resilient elastomeric wiper element sandwiched between a pair of stiffening backers or rails which are secured together at their projecting ends to hold the wiper blade in place. This unit is adapted to be slipped into the engaging claws of the secondary yoke or bow members of the usual wiper arm superstructure, and at least one of the backers or rails is provided with a simple pivotal latch member which can be swung into position to loosely trap a claw of the secondary yoke on a rail and thus prevent relative longitudinal sliding movement between the rail and claw. The invention utilizes the resilience of the elastomeric wiper member itself to assure maintenance of the latch in locked position, yet permit the latch to be easily opened when replacement of the wiper unit is necessary. Thus a practical, inexpensive, safe product, which is easily replacable, is afforded.

The foregoing objectives in a windshield wiper replacement unit are illustrated in a presently preferred embodiment of the invention which is shown in the accompanying drawings and described in detail below. In the drawings, FIG. 1 is a view in side elevation of the improved windshield wiper replacement assembly as attached to the wiper arm in a typical automotive windshield inatallation;

FIG. 2 is a fragmentary perspective view on an enlarged scale of the wiper blade assembly and latching means for attaching it to one of the supporting yoke or bow members of the wiper arm superstructure;

FIG. 3 is a fragmentary plan view, looking from below in FIG. 2, of the replacement wiper blade unit latched to the secondary bow; and FIG 4 is a similar view but showing the device in unlatched condition to permit withdrawal of the replacement unit.

As seen in FIG. 1, an automobile windshield 10 is provided with a wiper assembly consisting of a wiper arm 12 mounted on shaft 14 which is motor driven to oscillate the wiper arm. At its outer end, arm 12 is pivotally connected to the mid point of a primary yoke 16, and the latter forms a bridge between secondary yokes 18, being pivotally connected at the mid points of the latter to dispose them in tiered alignment with yoke 16 and wiper arm 12. Secondary yokes 18 support resilient wiper blade element 20 which acts as a squeegee for wiping the surface of windshield 10. The tiered yoke superstructure arrangement is employed to distribute pressure along the length of squeegee element 20 to make it conform to the changing contour of the windshield surface as the wiper arm oscillates the squeegee back and forth.

Referring now to FIG. 2, squeegee element 20 is a flexible strip of rubber or other suitable elestomeric material, and is of generally isosceles triangle cross-section. Element 20 has a progressively inwardly stepped lower portion 22 which functions as the wiping edge or edges in actual contact with the surface of the windshield, and this is flexibly joined at 23 to an upper body portion 24. On either side of the body portion there is a longitudinal, narrow, receiving slot 26 parallel to and spaced closely adjacent the base of the triangle. A flat stiff metal rail or backer 28 is received edgewise in each of slots 26, the thickness of each rail being substantially equal to the width of slots 26, while the width of the rails is substantially equal to the depth of slots 26. Rails 26 project endwise of squeegee member 20 and are linked together at such points by wire staples 30 passing loosely through holes 32 in the rails. In this manner, squeegee element 20 is sandwiched between rails 28 and is prevented from endwise escape by the staples.

The outer edges of rails 28 are exposed at each side of the wiper blade assembly to form tracks which are adapted to slidingly receive and be engaged by paired claws 34 formed on each end of bow members 18. Tracks 28 are normally held apart by the intervening portion of the upper body 24 of resilient squeegee member 20, which prevents lateral disengagement of claws 34 from the rails so that assembly of the replacement wiper unit to bows 18, and disassembly therefrom, is normally confined to sliding the bows and replacement wiper unit relative to each other.

In order to lock the replacement wiper unit to bows 18 for normal operation, one of rails 28 has a latching lever 36 provided with a detent notch 38 for trapping a claw 34 of bow 18 against free sliding movement on rail 28. As seen in FIGS. 3 and 4, lever 36 is of plate-like configuration of somewhat greater width than rail 28, being pivotally secured to a face of the rail by eyelet 40. Lever 36 can be swung between a latching position (FIG. 3) where it is generally aligned with rail 28, and an unlatched position (FIG. 4) where the lever is swung outwardly to non-aligned position with respect to the rail. Provision is made for retaining lever 36 in latched position, such provision taking the form of a lug 42 on the inner edge of the lever near its free end which is bent approximately perpendicularly to the body of the lever. Lug 42 is engagable behind the inner edge of rail 18 when the lever is swung to its latching position, the pivotal joint of the lever at eyelet 40 being sufficiently "sloppy" to allow the lever to be moved out of its normal plane of swinging movement to accomplish this. When the replacement wiper unit is in proper position on bows 18, one of the claws 34 will be positioned so as to be trapped in detent notch 38 of the lever in latched position.

Since the combined thickness of rail 28, lever 36, and lug 42 exceed the width of slot 36 in the resilient squeegee blade 20, the margins of the resilient material adjacent slot 26 must be distorted to permit latch 36 to enter the slot and lug 42 to pass over rail 28 during engagement of the latch. This distortion of the resilient material is utilized to act as a cushion or spring, assuring that the "sloppy" pivot connection of the lever cannot accidentally allow the latch lug to become disengaged from the rail. Still, when it is necessary to replace the wiper unit, it is a simple matter for a garage service man to grasp the projecting edge of latch lever 36 and press downwardly to release lug 42 from behind rail 28 and then swing the latch lever outwardly, freeing claw 34 from detent notch 38 so that the wiper unit can be slidingly removed from the claws of bows 18 and a new replacement wiper unit inserted and again latched in position. The manipulation of lever 36 can be further facilitated by the provision of a finger grip 44 formed on the projecting outer edge of the lever.

What is claimed is:

1. In a replacement windshield wiper unit adapted to be slidably received by paired claws of a wiper arm pressure-distributing bow, the combination which comprises an elongate, resilient, elastomeric wiper blade of generally isosceles triangular cross-section having a narrow, longitudinally extending receiving slot in each of its sides parallel to and spaced closely adjacent the triangle base, a flat metal rail received in each of said slots, the width of each rail being only slightly greater than the depth of the slot, and the length of each rail being sufficient to project endwise of the elastomeric wiper blade, linking means interconnecting the projecting ends of said rails to retain said elastomeric wiper blade in sandwiched condition between said rails, and a latching lever secured at one of its ends to one of said rails for swinging movement in a plane generally parallel to the base of said triangular wiper blade between a latching position in which said lever is in substantial alignment with the rail and an unlatched position in which it is swung substantially out of alignment with said rail;

said lever having detent means intermediate its length for loosely receiving a claw of the wiper arm bow and restricting relatively sliding movement between such claw and the rail when said lever is in its latching position, said lever also having means at its free end for securing said lever to said rail to prevent accidental swinging movement thereof out of said latching position.

2. A replacement windshield wiper unit as defined in claim 1, wherein said latching lever is of plate-like configuration of greater width than the rail to which it is pivotally joined, said lever being pivotally secured to said rail such that in said latched position one edge of said plate coincides with the inner edge of said rail, while the outer edge of said plate projects substantially outwardly of the outer edge of said rail.

3. A replacement windshield wiper unit as defined in claim 2, wherein said latching lever securement means comprises a lug extending transversely of the plane of swinging movement at the inner edge of said plate-like lever, said lug being engagable behind the inner edge of said rail when said lever is in latching position.

4. A replacement windshield wiper unit as defined in claim 3, wherein the width of the longitudinal slots in said elastomeric wiper blade is less than the combined thickness of the rail, latching lever and transverse lug at the free end of said lever, whereby portions of said elastomeric blade grip and resiliently retain said lever lug in latching relation to said rail.

5. A replacement windshield wiper unit as defined in claim 2, wherein said latching lever is formed in its outer edge to provide a finger grip which extends substantially along but in outwardly spaced relation to the outer edge of the rail.

6. A replacement windshield wiper blade unit as defined in claim 2, wherein said detent means on said lever comprises a notch opening onto the inner edge of said plate, the notch depth being greater than the width of the rail and the notch width being greater than the width of the claw of the pressure-distributing wiper arm bow.

7. A replacement windshield wiper blade unit as defined in claim 1, which further includes a metal eyelet for pivotally securing said lever to the rail.

8. A replacement windshield wiper blade unit as defined in claim 7, wherein said rails are each provided with a hole in their projecting ends, and aid linking means interconnecting the projecting ends of said rails comprise wire staples passing through said holes.

9. A replacement windshield wiper unit as defined in claim 1, wherein said latching lever is pivotally secured to said rail by said linking means interconnecting adjacent projecting ends of said rails.

* * * * *